United States Patent
Maenza

Patent Number: 5,968,305
Date of Patent: Oct. 19, 1999

[54] LASER SCANNING APPLIED TO BONDING OF MULTI-LAYERED OPTICAL RECORDING MEDIUMS

[75] Inventor: Glenn J. Maenza, Glen Mills, Pa.

[73] Assignees: Sony Corporation, Tokyo, Japan; Sony Electronics, Inc., Park Ridge, N.J.

[21] Appl. No.: 08/957,467

[22] Filed: Oct. 24, 1997

[51] Int. Cl.⁶ .................................................. B32B 31/28
[52] U.S. Cl. .................................. 156/272.8; 156/275.5; 156/275.7; 156/379.6; 369/286
[58] Field of Search ............................. 156/272.2, 272.8, 156/275.5, 275.7, 379.6, 538, 539; 369/286

[56] References Cited

U.S. PATENT DOCUMENTS

| | | | |
|---|---|---|---|
| 3,560,291 | 2/1971 | Foglia et al. | 156/272.8 |
| 4,990,208 | 2/1991 | Kano | 156/275.3 |

*Primary Examiner*—Michael W. Ball
*Assistant Examiner*—Michael A Tolin
*Attorney, Agent, or Firm*—Ronald P. Kananen; Rader, Fishman & Grauer

[57] ABSTRACT

Bonding of a plurality optical recording substrates in multi-layered optical recording mediums are facilitated by using ultraviolet lasers in a line-by-line manner such as telecentric scanning, raster scanning, circular scanning, or the like.

16 Claims, 4 Drawing Sheets

LASER SCANNING APPLIED TO BONDING OF MULTI-LAYERED OPTICAL RECORDING MEDIUMS

FIELD OF INVENTION

The present invention relates to a method to form multi-layered bonding substrates of optical recording media. In particular, the present invention uses one or more ultraviolet laser scanners to bond multiple layers of optical recording medium substrates together.

BACKGROUND OF THE INVENTION

Optical recording mediums, such as compact disks ("CD"), have been widely used to record audio, video, and computer data. However, some optical recording mediums, such as laser discs ("LD") and digital versatile discs ("DVD") require much larger storage capacity than currently provided by CDs in order to record digitized audio and video information of full-length feature movies, for example. One way of increasing the storage capacity of optical recording mediums is by bonding two or more optical recording medium substrates together.

Typically, the recording substrates of these multi-layered optical recording mediums are bonded together by materials that are curable when exposed to ultraviolet ("UV") radiation. First, UV bonding material is applied between two or more optical recording medium substrates. Then, the multi-layered optical recording medium is exposed to a UV radiation source to complete the bonding process. Currently, wideband sources of UV light are used to bond these multiple layers of optical recording medium substrates together.

As shown in FIG. 1, one prior art system includes a UV light source 20 and a double substrate disc 22 to be bonded. In order to bond the two substrates of disc 22, UV light source 20 irradiates the entire surface of double substrate disc 22 for the bonding to take effect.

As shown in FIG. 2, another prior art system includes a UV light source 20, a slit 24, and a double substrate disc 26 to be bonded. In this system, UV radiation from UV light source 20 is passed through slit 24. Consequently, only a line of UV radiation 28 is exposed onto double substrate disc 26. Therefore, double substrate disc 26 is rotated either clockwise or counter clockwise to expose the entire surface of double substrate disc 26 to the line of UV radiation 28.

Currently, wideband light sources, such as mercury fusion lamps are used as the UV light source of the prior art systems. Wideband light sources are difficult to spectrally control and generate large amounts of infrared ("IR") energy. Although optical filters are used to adjust the resulting spectrum reaching the substrates of multi-layered optical mediums, large amounts of heat are produced in the substrates that can cause warpage. Furthermore, longer curing times are necessary with wideband UV light sources.

SUMMARY OF THE INVENTION

The problems and short comings of the prior art as described above are overcome by the system and method of the present invention.

The system of the present invention comprises a plurality of optical recording substrates stacked on top of each to form a multi-layered optical recording medium with an exposed surface, a laser for emitting a beam of UV radiation, and a means for directing the beam of UV radiation on the exposed surface. The directing means directs the beam of UV radiation on the exposed surface of the multi-layered optical recording medium in a line-by-line manner until the exposed surface in its entirety has been irradiated by the beam of UV radiation to bond the plurality of optical recording substrates together.

In particular, a method of bonding a multi-layered optical recording medium used by the system of the present invention comprises the steps of stacking a plurality of optical recording substrates on top of each other to form a multi-layered optical recording medium with an exposed surface, emitting a beam of UV radiation using an UV laser, and directing the beam of UV radiation on the exposed surface of the multi-layered optical recording medium in a line-by-line manner until the surface in its entirety has been irradiated by the beam of UV radiation to bond the plurality of optical recording substrates together.

In one embodiment of the present invention, the step of directing the beam of UV radiation may be accomplished by telecentric scanning. The optical recording medium is rotated under a scanning beam that moves radially from the center of the recording medium to the outer edge or vice versa.

In another embodiment of the present invention, the step of directing the beam of UV radiation may be accomplished by raster scanning. The optical recording medium is held stationary under a scanning beam that scans from left to right or vice versa across the entire surface of the recording medium.

In yet another embodiment of the present invention, the step of directing the beam of UV radiation may be accomplished by circular scanning. The optical recording medium is held stationary under a scanning beam that scans in a circular manner spiraling in from the outer edge to the center or vice versa.

One advantage of the system and method of the present invention is that unwanted production of heat in the optical recording medium during the exposure process is reduced. Since the laser beam is focused on a small area at any given time, heat build-up is kept to a minimum.

Another advantage of the system and method of the present invention is that the spectrum of the UV radiation produced by the laser can be precisely controlled eliminating undesirable infrared energy.

Yet another advantage of the system and method of the present invention is that the laser facilitates focus of high concentrations of UV radiation to the desired area allowing shorter curing time.

Yet another advantage of the system and method of the present invention is an increase in reliability of the final product since the chances of warpage are decreased due to reduction in generation of heat and infrared energy. Further, the bonding between the multiple layers are consistent throughout the medium since the bonds are cured one point at a time with a constant intensity of UV radiation.

BRIEF DESCRIPTION OF DRAWINGS

The features and inventive aspects of the present invention will become more apparent upon reading the following detailed description, claims, and drawings, of which the following is a brief description:

DETAILED DESCRIPTION OF THE INVENTION

Figure 1:
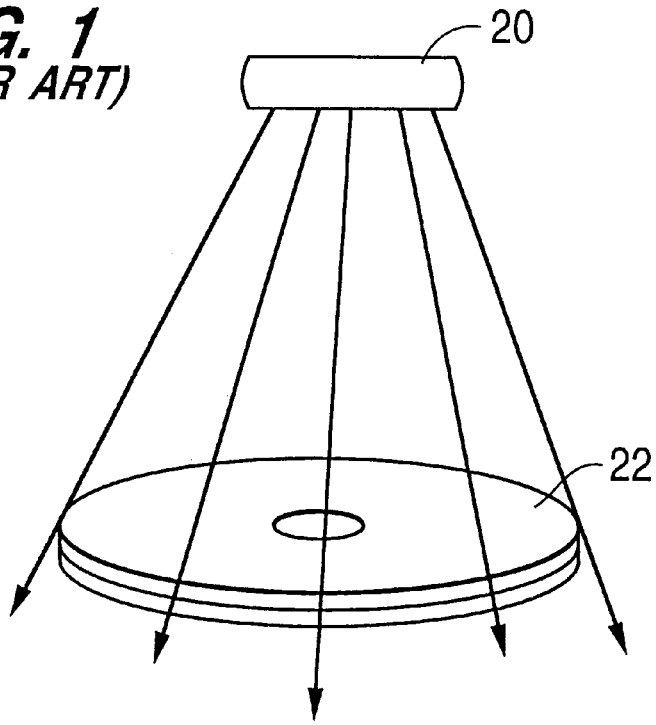
FIG. 1 is a schematic view of a prior art UV bonding system.
Figure 2:
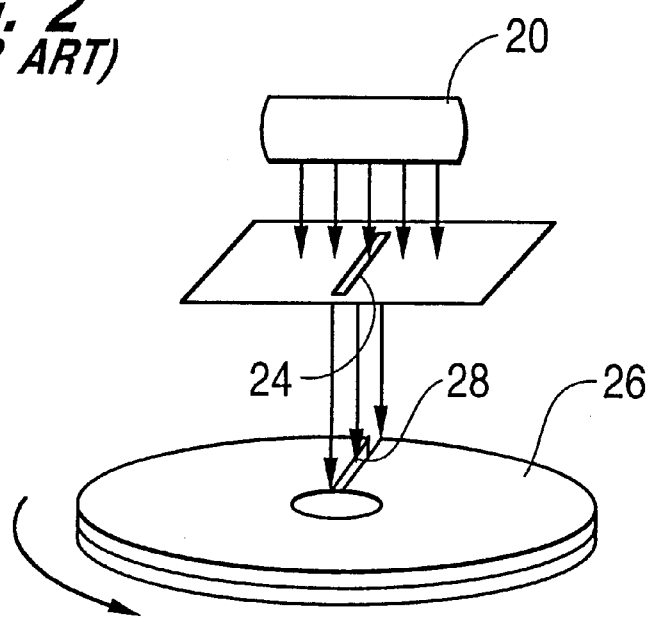
FIG. 2 is a schematic view of yet another prior art system.
Figure 3:
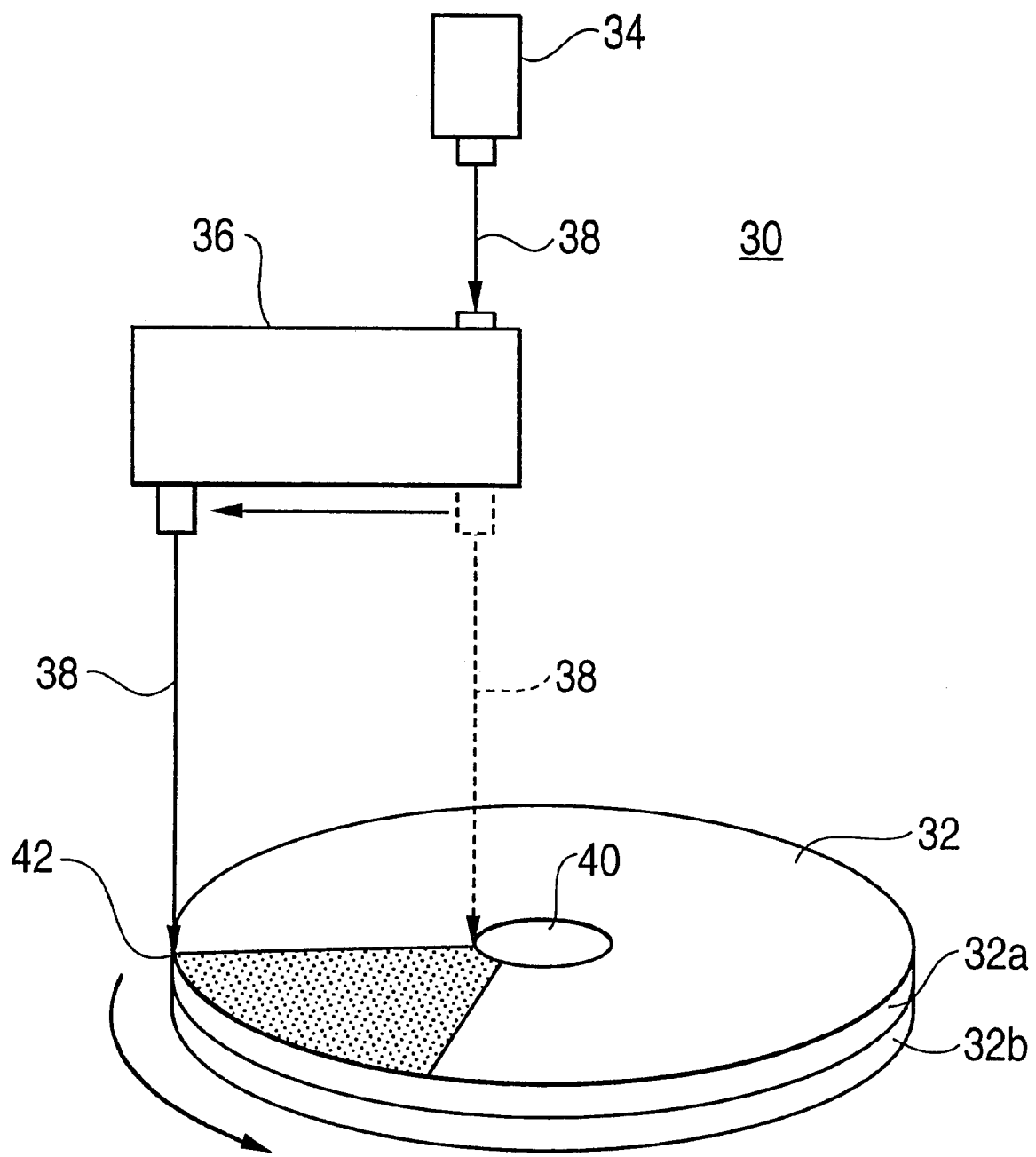
FIG. 3 is a schematic view of one embodiment of the present invention.

FIG. 3 shows a schematic view of one embodiment of the present invention. System 30 includes multi-layered optical recording medium 32 to be bonded, such as an LD or a DVD, formed by overlapping one optical recording substrate 32a on top of another optical recording substrate 32b. However, optical recording medium 32 is not limited to only two layers. More substrates may be added to increase the storage capability if necessary.

UV laser 34 is used in the bonding process of optical recording substrates 32a and 32b. UV laser 34 may be of any type well known in the art, i.e., eximer, tripled yttrium aluminum garnet ("YAG"), doubled alexandrite, etc. The actual choice of laser type would depend on the UV polymer used to bond optical recording substrates 32a and 32b since each UV polymer reacts to specific wavelengths of UV radiation.

Telecentric scanner 36 is used to direct beam 38 from UV laser 34 onto optical recording substrates 32a and 32b to facilitate the bonding process. One advantage of using telecentric scanners is that telecentric scanners direct a laser spot in a straight line with uniform intensity. This characteristic is necessary in order to achieve uniform bonding throughout the optical recording medium 32 when optical recording substrates 32a and 32b are bonded together.

The process by which optical recording substrates 32a and 32b are bonded together will be described herein. First, optical recording substrates 32a and 32b are overlapped to form multi-layered optical recording medium 32. Optical recording medium 32 is then placed on a rotating platform (not shown) and rotated at a steady speed in either a clockwise or counter clockwise direction. As optical recording medium 32 is rotated at a constant speed, UV laser 34 sends beam of UV radiation 38 into telecentric scanner 36. Telecentric scanner 36, then directs beam 38 onto optical recording medium 32.

As optical recording medium 32 rotates, telecentric scanner 36 scans beam 38 in a straight line from the inner edge 40 to outer edge 42. However, the system may be set so that telecentric scanner 36 scans beam 38 from the outer edge 42 to the inner edge 40 depending on the desired application. When the first pass is finished, the telecentric scanner 36 returns the beam 38 back to its starting position, i.e., at the inner edge 40 and repeats the scanning pass as optical recording medium 32 is rotated. The timing of the scanning and rotation of optical recording medium 32 are adjusted such that each of the scanned areas is optimally exposed. As beam 38 is passed on the surface of optical recording medium 32, a UV sensitive polymer (not shown) between optical recording substrates 32a and 32b is cured thereby bonding substrates 32a and 32b together. The surface of optical recording medium 32 is scanned by beam 38 in this line-by-line manner until optical recording medium 32 in its entirety has been irradiated with beam 38.

Figure 4:
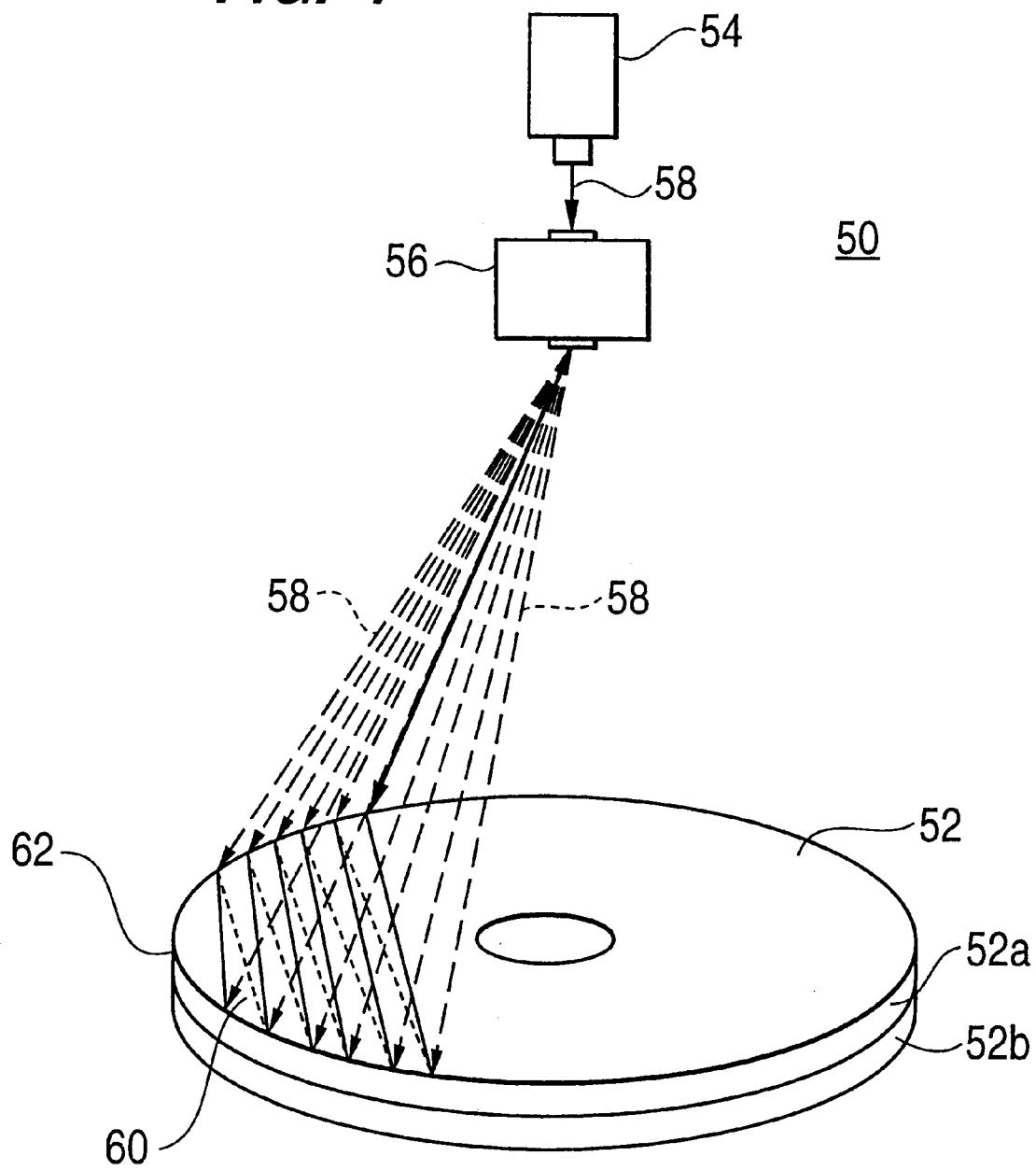
FIG. 4 is a schematic view of another embodiment of the present invention.

FIG. 4 shows a schematic view of a second embodiment of the present invention. System 50 includes optical recording medium 52 formed by overlapping one optical recording substrate 52a on top of anther optical recording substrate 52b, and a UV laser 54 similar to system 30 of FIG. 3. System 50 further includes raster scanner 56 used in conjunction with UV laser 54 to direct beam 58 on optical recording medium 52 to facilitate bonding of optical recording substrates 52a and 52b.

The process by which optical recording substrates 52a and 52b are bonded together will be described herein. First, optical recording substrates 52a and 52b are overlapped to form a multi-layered optical recording meduim 52. Optical recording meduim 52 is then placed on a stationary platform (not shown). Next, UV laser 54 sends a beam of UV radiation 58 to the raster scanner 56. Raster scanner 56, then directs beam 58 onto the optical recording medium 52.

Raster scanner 56 operates in a manner similar to raster scanners used in televisions or video monitors. Raster scanner 56 starts at predetermined point 60 of the outer edge 62. UV beam 58 is then swept on the surface of the optical recording medium 52 line-by-line until the surface in its entirety has been irradiated by UV beam 58. Beam 58 may be swept from left-to-right or right-to-left depending on the desired application.

Figure 5:
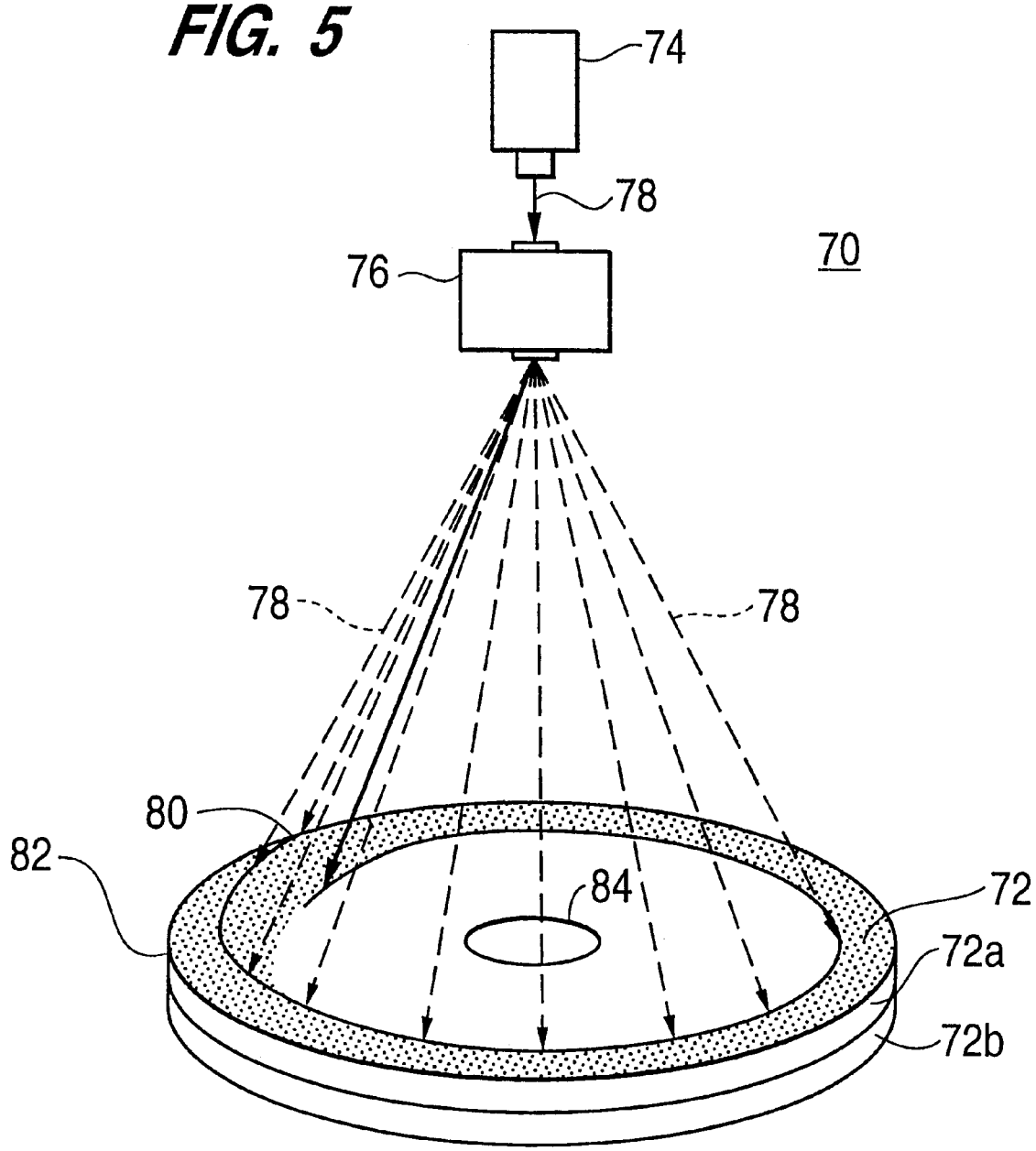
FIG. 5 is a schematic view of yet another embodiment of the present invention.

FIG. 5 shows a schematic view of a third embodiment of the present invention. System 70 includes an optical recording medium 72 formed by overlapping one optical recording substrate 72a on top of anther optical recording substrate 72b, and a UV laser 74 similar to system 30 of FIG. 3. System 70 further includes a circular scanner 76 used in conjunction with a UV laser 74 to direct beam 78 on the optical recording medium 72 to facilitate bonding of the optical recording substrates 72a and 72b.

The process by which the optical recording substrates 72a and 72b are bonded together will be described herein. First, optical recording substrates 72a and 72b are overlapped to form a multi-layered optical recording medium 72. Optical recording medium 72 is then placed on a stationary platform (not shown). Next, UV laser 74 sends a beam 78 of UV radiation to the circular scanner 76. Circular scanner 76, then directs the beam 78 onto the optical recording medium 72.

Circular scanner 76 operates in a manner as described below. Circular scanner 76 starts at predetermined point 80 on the outer edge 82. UV beam 78 is then swept on the surface of the optical recording medium 72 line-by-line in a spiraling movement towards inner edge 84 until the surface in its entirety has been irradiated by UV beam 78. Beam 78 may be swept in a spiraling direction from the outer edge 82 to the inner edge 84 as shown in FIG. 5 or originate from the inner edge 84 and spiral outwards towards the outer edge 82 depending on the desired application.

Having fully described the preferred embodiments of the invention, variations and modifications may be employed, such as employment of other known line-by-line scanning methods without departing from the scope of the present invention. Accordingly, the following claims should be studied to learn the true scope of the present invention.

What is claimed is:

1. A system for bonding a multi-layered optical recording medium comprising:

a plurality of optical recording substrates stacked on top of each other to form said multi-layered optical recording medium with an ultraviolet curable material interposed between said substrates;

a laser for emitting a beam of ultraviolet radiation; and a scanner for directing said beam of ultraviolet radiation in a predetermined pattern on a surface of said stacked substrates until said surface in its entirety has been irradiated by said beam of ultraviolet radiation to bond said plurality of optical recording substrates together by curing said curable material between said substrates.

2. The system of claim 1, wherein said scanner is a telecentric scanner.

3. The system of claim 1, wherein said scanner is a raster scanner.

4. The system of claim 1, wherein said scanner is a circular scanner.

5. The system of claim 1, wherein said multi-layered optical recording medium is a laser disc.

6. The system of claim 1, wherein said multi-layered optical recording medium is a digital versatile disk.

7. A method of bonding a layered optical recording medium comprises the steps of:

(a) stacking a plurality of optical recording substrates on each to form said multi-layered optical recording medium with an exposed surface;

(b) emitting a beam of ultraviolet radiation using an ultraviolet laser; and (c) directing said beam of ultraviolet radiation on said exposed surface of said multi-layered optical recording medium in a line-by-line manner until said surface in its entirety has been irradiated by said beam of ultraviolet radiation to bond said plurality of optical recording substrates together.

8. The method of claim 7, wherein said step (c) is accomplished by telecentric scanning.

9. The method of claim 8, further comprising the step of:

(d) turning said multi-layered optical recording medium under said telecentric scanning beam of ultraviolet radiation to expose said surface in its entirety to said radiation.

10. The method of claim 7, wherein said step (c) is accomplished by raster scanning.

11. The method of claim 7, wherein said step (c) is accomplished by circular scanning.

12. The method of claim 7, wherein said multi-layered optical recording method is either a laser disc or a digital versatile disk.

13. A system for bonding a multi-layered optical recording medium comprising:

a plurality of optical recording substrates stacked on top of each other to form said multi-layered optical recording medium with an ultraviolet curable material interposed between said substrates;

a laser means for emitting a beam of ultraviolet radiation; and a means for directing said beam of ultraviolet radiation in a predetermined pattern on a surface of said stacked substrates until said surface in its entirety has been irradiated by said beam of ultraviolet radiation to bond said plurality of optical recording substrates together by curing said curable material between said substrates.

14. The system of claim 13, wherein said directing means is a telecentric scanning means.

15. The system of claim 13, wherein said directing means is a raster scanning means.

16. The system of claim 13, wherein said directing means is a circular scanning means.

* * * * *